United States Patent
Akedo et al.

(10) Patent No.: US 9,136,527 B2
(45) Date of Patent: Sep. 15, 2015

(54) ELECTRODE THIN FILM, ALL-SOLID LITHIUM BATTERY, AND METHOD OF MANUFACTURING ELECTRODE FILM

(75) Inventors: Jun Akedo, Tsukuba (JP); Daniel Popovici, Tsukuba (JP); Hideyuki Nagai, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 13/885,259

(22) PCT Filed: Nov. 15, 2011

(86) PCT No.: PCT/IB2011/002694
§ 371 (c)(1),
(2), (4) Date: Jun. 21, 2013

(87) PCT Pub. No.: WO2012/066405
PCT Pub. Date: May 24, 2012

(65) Prior Publication Data
US 2013/0280613 A1    Oct. 24, 2013

(30) Foreign Application Priority Data
Nov. 15, 2010   (JP) .................................. 2010-255227

(51) Int. Cl.
*H01M 4/04* (2006.01)
*C01G 51/00* (2006.01)
(Continued)

(52) U.S. Cl.
CPC ............. *H01M 4/0421* (2013.01); *C01G 51/42* (2013.01); *H01M 4/0402* (2013.01); *H01M 4/0419* (2013.01); *H01M 4/06* (2013.01); *H01M 4/131* (2013.01); *H01M 4/1391* (2013.01); *H01M 4/485* (2013.01); *H01M 4/525* (2013.01); *H01M 6/18* (2013.01); *H01M 10/0525* (2013.01); *H01M 10/0562* (2013.01); *C01P 2006/10* (2013.01); *C01P 2006/40* (2013.01); *H01M 4/0404* (2013.01); *H01M 4/0483* (2013.01);
(Continued)

(58) Field of Classification Search
CPC ............ H01M 4/0421; H01M 4/0404; H01M 4/0419; H01M 4/0483; H01M 4/131; H01M 4/06; H01M 4/1391; H01M 4/485; H01M 4/525
See application file for complete search history.

(56) References Cited

U.S. PATENT DOCUMENTS

2005/0271576 A1    12/2005  Awano et al.
2007/0003829 A1*    1/2007  Imachi et al. ................. 429/152
(Continued)

FOREIGN PATENT DOCUMENTS

EP      1 032 068 A2    8/2000
JP      A-2005-078985   3/2005
(Continued)

OTHER PUBLICATIONS

Popovici et al., "All-Solid-State Li-ion Battery Fabricated by Aerosol Deposition Technique," J. of Thermal Spray Techn., 2008, vol. 17 (2), Cover Sheet and Abstract.
(Continued)

*Primary Examiner* — Helen O Conley
(74) *Attorney, Agent, or Firm* — Oliff PLC

(57) ABSTRACT

An electrode thin film to be used in an all-solid lithium battery is formed predominantly of lithium cobaltate and has a density larger than or equal to 3.6 g/cm$^3$ and smaller than or equal to 4.9 g/cm$^3$.

6 Claims, 3 Drawing Sheets

(51) Int. Cl.
  *H01M 4/06* (2006.01)
  *H01M 4/131* (2010.01)
  *H01M 4/1391* (2010.01)
  *H01M 4/485* (2010.01)
  *H01M 4/525* (2010.01)
  *H01M 6/18* (2006.01)
  *H01M 10/0525* (2010.01)
  *H01M 10/0562* (2010.01)
  *H01M 4/02* (2006.01)

(52) U.S. Cl.
  CPC ... *H01M 2004/021* (2013.01); *H01M 2004/028* (2013.01); *H01M 2300/002* (2013.01); *H01M 2300/0068* (2013.01); *Y02E 60/122* (2013.01)

(56) References Cited

U.S. PATENT DOCUMENTS

2007/0015061 A1* 1/2007 Klaassen ............... 429/322
2011/0070365 A1  3/2011 Kawaoka

FOREIGN PATENT DOCUMENTS

| JP | A-2008-166142 | 7/2008 |
| JP | A-2009-199920 | 9/2009 |
| JP | A-2009-293107 | 12/2009 |

OTHER PUBLICATIONS

Fragnaud et al., "Thin film components for solid state lithium batteries," Sensors and Actuators A, 1995, vol. 51, pp. 21-23.

* cited by examiner

ELECTRODE THIN FILM, ALL-SOLID LITHIUM BATTERY, AND METHOD OF MANUFACTURING ELECTRODE FILM

BACKGROUND OF THE INVENTION

1. Field of the Invention

The invention relates to an electrode thin film to be used in an all-solid lithium battery.

2. Description of Related Art

With a rapid proliferation of information-related equipment and communication equipment, such as personal computers, camcorders, and cellular phones, in recent years, it becomes important to develop a battery used as a power source of the information-related equipment or the communication equipment. In addition, in automobile industry, or the like, development of a high-power and high-capacity battery for electric vehicles or hybrid vehicles has been proceeding. Currently, among various types of batteries, lithium batteries becomes a focus of attention in terms of high energy density.

Currently commercially available lithium batteries employ an electrolytic solution that contains a flammable organic solvent. Therefore, it is necessary to install a safety device that suppresses an increase in temperature in the event of a short circuit or improve a structure or a material for short-circuit prevention. In contrast to this, all-solid lithium batteries that replace an electrolytic solution with a solid electrolyte layer do not use a flammable organic solvent in the batteries. For this reason, it is considered that the safety devices for the all-solid lithium batteries are simplified and the all-solid lithium batteries are excellent in manufacturing cost and productivity.

On the other hand, there is known a method of forming an electrode used in an all-solid lithium battery by aerosol deposition. For example, Japanese Patent Application Publication No. 2009-293107 (JP-A-2009-293107) describes that aerosol deposition (the pressure in the chamber is 100 Pa) is used to form a second film that contains lithium cobaltate ($LiCoO_2$) and a phosphate solid electrolyte ($Li_{1.3}Al_{0.3}Ti_{0.7}(PO_4)_3$) in a mixed state. On the other hand, Japanese Patent Application Publication No. 2008-166142 (JP-A-2008-166142) describes a method of forming an active material layer (electrode) by aerosol deposition although it is the method of forming an electrode for not an all-solid lithium battery but a lithium battery that uses an electrolytic solution.

In terms of increasing the power of a battery, an electrode thin film (active material layer) having a high lithium ion conductivity is sought.

SUMMARY OF THE INVENTION

The invention provides an electrode thin film having a high lithium ion conductivity.

The inventors has diligently conducted researches and finally found that a thin film formed predominantly of lithium cobaltate has a high lithium ion conductivity within a specific density range, and has made the invention.

A first aspect of the invention provides an electrode thin film to be used in an all-solid lithium battery. The electrode thin film is formed predominantly of lithium cobaltate and has a density larger than or equal to 3.6 $g/cm^3$ and smaller than or equal to 4.9 $g/cm^3$.

According to the above first aspect, when the density of the electrode thin film falls within a specific range, it is possible to make the electrode thin film having a high lithium ion conductivity. Furthermore, according to the above first aspect, when the density of the electrode thin film falls within a specific range, it is possible to make the electrode thin film having a high mechanical strength.

In the above first aspect, the electrode thin film may be formed using one selected from the group consisting of aerosol deposition, gas deposition, flame spraying, and cold spraying. In particular, since it is possible to form an electrode thin film at room temperature and the density of the electrode thin film is easily controlled, the aerosol deposition or the gas deposition may be used.

In the above first aspect, a pressure when the electrode thin film is formed may be higher than 100 Pa and smaller than or equal to 400 Pa.

In the above first aspect, a percentage of lithium cobaltate in the electrode thin film may be higher than or equal to 90 mol %.

In addition, a second aspect of the invention provides an all-solid lithium battery. The all-solid battery includes: a positive electrode active material layer that contains a positive electrode active material; a negative electrode active material layer that contains a negative electrode active material; and a solid electrolyte layer that is formed between the positive electrode active material layer and the negative electrode active material layer, wherein the positive electrode active material layer is the above described electrode thin film.

According to the above second aspect, the above described electrode thin film is used as the positive electrode active material layer to make it possible to provide a high-power battery.

In the above second aspect, the all-solid lithium battery may be a secondary battery.

In addition, a third aspect of the invention provides a method of manufacturing an electrode thin film to be used in an all-solid lithium battery. The method includes forming an electrode thin film that is formed predominantly of lithium cobaltate and that has a density larger than or equal to 3.6 $g/cm^3$ and smaller than or equal to 4.9 $g/cm^3$.

According to the above third aspect, it is possible to obtain the electrode thin film having a high lithium ion conductivity by forming the electrode thin film so as to be able to obtain a specific density. Furthermore, according to the above third aspect, it is possible to obtain the electrode thin film having a high mechanical strength by forming the electrode thin film so as to be able to obtain a specific density.

In the above third aspect, when the electrode thin film is formed, the electrode thin film may be formed using one selected from the group consisting of aerosol deposition, gas deposition, flame spraying, and cold spraying. In particular, since it is possible to form an electrode thin film at room temperature and the density of the electrode thin film is easily controlled, the aerosol deposition or the gas deposition may be used.

In the above third aspect, a pressure when the electrode thin film is formed may be higher than 100 Pa and smaller than or equal to 400 Pa.

In the above third aspect, a percentage of lithium cobaltate in the electrode thin film may be higher than or equal to 90 mol %.

According to the above aspects of the invention, it is possible to obtain an electrode thin film having a high lithium ion conductivity.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
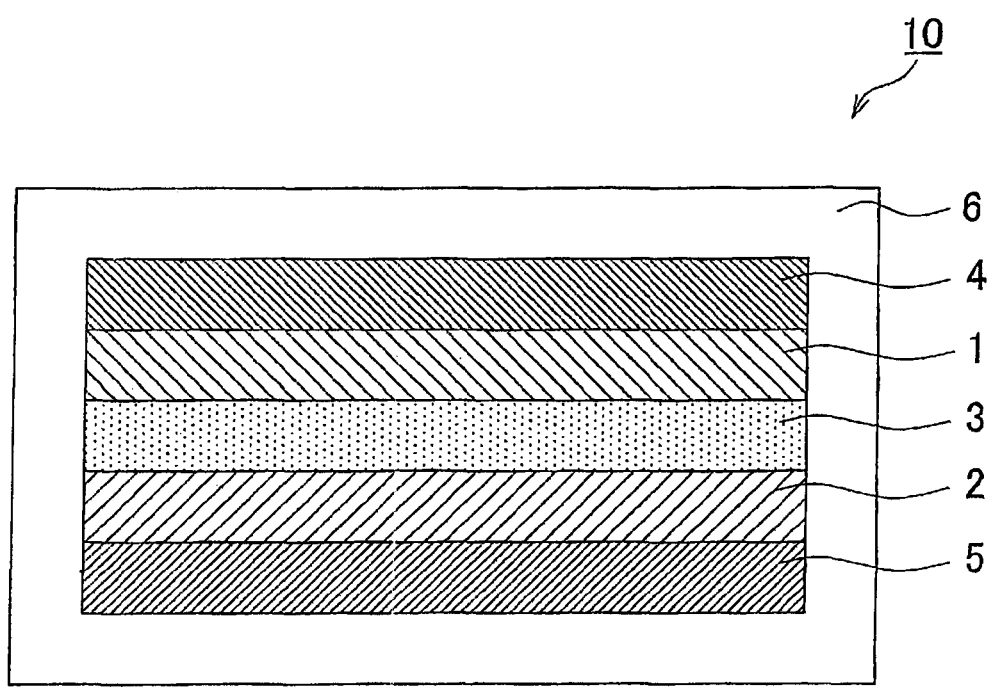
FIG. 1 is a schematic cross-sectional view that shows an example of an all-solid lithium battery according to an embodiment of the invention.

Hereinafter, an electrode thin filth, an all-solid lithium battery and a method of manufacturing an electrode thin film according to an embodiment of the invention will be described in detail.

A. Electrode Thin Film

First, the electrode thin film according to the embodiment of the invention will be described. The electrode thin film according to the embodiment of the invention is used in an all-solid lithium battery and is characterized by being formed predominantly of lithium cobaltate and having a density larger than or equal to 3.6 g/cm³ and smaller than or equal to 4.9 g/cm³.

According to the embodiment of the invention, the density of the electrode thin film falls within a specific range, so it is possible to make the electrode thin film having a high lithium ion conductivity. Moreover, according to the embodiment of the invention, the density of the electrode thin film falls within a specific range, so it is possible to make the electrode thin film having a high mechanical strength. In addition, the electrode thin film according to the embodiment of the invention may be manufactured by, for example, aerosol deposition. JP-A-2009-293107 describes that aerosol deposition (the pressure in the chamber is 100 Pa) is used to form a second film that contains lithium cobaltate (LiCoO₂) and a phosphate solid electrolyte ($Li_{1.3}Al_{0.3}Ti_{0.7}(PO_4)_3$) in a mixed state. However, as will be described in an example later, when the pressure in the chamber was set at 100 Pa, the density of the lithium cobaltate thin film exceeded a real density. Note that the demerit in this case will be described later.

A feature of the electrode thin film according to the embodiment of the invention is that it is formed predominantly of lithium cobaltate. The feature that "the electrode thin film is formed predominantly of lithium cobaltate" means that the predominant component of the electrode thin film is lithium cobaltate. The percentage of lithium cobaltate in the electrode thin film is desirably higher than or equal to 90 mol % and more desirably higher than or equal to 95 mol %. In addition, the percentage of lithium cobaltate contained in the electrode thin film may be determined by, for example, fluorescent X-ray diffractometry or inductively coupled plasma (ICP) (emission spectroscopic analysis). Note that the lithium cobaltate in the embodiment of the invention is usually crystalline. In addition, the electrode thin film according to the embodiment of the invention may contain a small amount of at least one of a conducting material and a solid electrolyte material.

Furthermore, another feature of the electrode thin film according to the embodiment of the invention is that it has a density that is larger than or equal to 3.6 g/cm³. As will be described in the example later, as the density of the electrode thin film is larger than or equal to a specific value, the lithium ion conductivity remarkably increases. Moreover, the density (denseness) itself also remarkably increases when the density of the electrode thin film is larger than or equal to a specific value. In addition, the electrode thin film according to the embodiment of the invention desirably has a density that is larger than or equal to a density at which a lithium ion conductivity higher than that of a lithium cobaltate thin film having a theoretical density (4.9 g/cm³) is exhibited.

In addition, another feature of the electrode thin film according to the embodiment of the invention is that it has a density lower than or equal to 4.9 g/cm³. Here, the theoretical density of lithium cobaltate is 4.9 g/cm³. Therefore, when the electrode thin film according to the embodiment of the invention has a density larger than 4.9 g/cm³, the thin film has a strain. The strain of the thin film is considered to be a factor of a decrease in crystallinity, and it is considered that a decrease in crystallinity may interfere the movement of lithium ions (insertion and desorption of lithium ions and conduction of lithium ions). Moreover, when a strain occurs in the thin film, the thin film may easily peel, the thin film may easily crack, and the capacity may decrease as reaction area decreases, for example. Thus, the electrode thin film according to the embodiment of the invention desirably has a density lower than or equal to the theoretical density of lithium cobaltate. Furthermore, the density of the electrode thin film according to the embodiment of the invention is desirably lower than or equal to 4.85 g/cm³ (relative density 99%) and more desirably lower than or equal to 4.66 g/cm³ (relative density 95%). This is because the stress caused by swelling and contraction due to insertion and desorption of lithium ions is moderated and a more-preferable higher lithium-ion-conductivity electrode thin film is obtained.

The density of the electrode thin film according to the embodiment of the invention may be obtained by the following method. That is, the volume of the electrode thin film is obtained from the area and thickness of the electrode thin film. The thickness of the electrode thin film may be obtained using, for example, a commercially available film thickness measuring device. After that, the density (g/cm³) of the electrode thin film may be obtained by measuring the weight of the electrode thin film and then dividing the weight by the volume of the electrode thin film.

The electrode thin film according to the embodiment of the invention desirably has a high lithium ion conductivity at room temperature. This is because a high-power all-solid lithium battery is obtained. The lithium ion conductivity is, for example, desirably higher than or equal to $2 \times 10^{-4}$ S/cm and more desirably higher than or equal to $6 \times 10^{-4}$ S/cm. In addition, the electrode thin film according to the embodiment of the invention desirably has a lithium ion conductivity higher than that of a lithium cobaltate thin film having a theoretical density (4.9 g/cm³). Specifically, the lithium ion conductivity is desirably higher than or equal to $9.2 \times 10^{-4}$ S/cm and more desirably higher than or equal to $1 \times 10^{-3}$ S/cm.

The lithium ion conductivity of the electrode thin film according to the embodiment of the invention can be obtained by the following method. That is, the lithium ion conductivity can be measured by alternating-current impedance measuring technique by arranging conductive metal films on both surfaces of the electrode thin film.

In addition, the thickness of the electrode thin film according to the embodiment of the invention is not particularly limited. For example, the thickness of the electrode thin film desirably ranges from 0.1 μm to 1000 μm.

The electrode thin film according to the embodiment of the invention is usually used in an all-solid lithium battery. In addition, the electrode thin film according to the embodiment of the invention may be used in any one of a positive electrode and a negative electrode; however, lithium cobaltate hag a high oxidation-reduction potential, so the electrode thin film is desirably used as a positive electrode active material layer. In addition, a method of obtaining the electrode thin film according to the embodiment of the invention will be described in detail in the following "C. Method of Manufacturing Electrode Thin Film". Particularly, the electrode thin film according to the embodiment of the invention is desirably formed by using aerosol deposition.

B. All-Solid Lithium Battery

Next, an all-solid lithium battery according to the embodiment of the invention will be described. The all-solid lithium battery according to the embodiment of the invention includes: a positive electrode active material layer that contains a positive electrode active material; a negative electrode active material layer that contains a negative electrode active material; and a solid electrolyte layer that is formed between the positive electrode active material layer and the negative electrode active material layer, wherein the positive electrode active material layer is the above described electrode thin film.

According to the embodiment of the invention, a high-power battery is obtained by using the above described electrode thin film as the positive electrode active material layer.

FIG. 1 is a schematic cross-sectional view that shows an example of the all-solid lithium battery according to the embodiment of the invention. The all-solid lithium battery 10 shown in FIG. 1 includes: a positive electrode active material layer 1 that contains a positive electrode active material; a negative electrode active material layer 2 that contains a negative electrode material; a solid electrolyte layer 3 that is formed between the positive electrode active material layer 1 and the negative electrode active material layer 2; a positive electrode current collector 4 that collects current from the positive electrode active material layer 1; a negative electrode current collector 5 that collects current from the negative electrode active material layer 2; and a battery case 6 that accommodates these components. A major feature of the embodiment of the invention is that the positive electrode active material layer 1 is the electrode thin film described in the above "A. Electrode Thin Film". Hereinafter, the battery according to the embodiment of the invention will be described component by component.

1. Positive Electrode Active Material Layer

The positive electrode active material layer in the embodiment of the invention is the same as that described in the above "A. Electrode Thin Film", so the description thereof is omitted.

2. Negative Electrode Active Material Layer

The negative electrode active material layer in the embodiment of the invention at least contains a negative electrode active material, and may contain at least one of a solid electrolyte material, a conducting material, and a binding agent where necessary. The negative electrode active material may be, for example, a metal active material or a carbon active material. The metal active material may be, for example, In, Al, Si, Sn, or the like. On the other hand, the carbon active material may be, for example, mesocarbon microbead (MCMB), highly oriented graphite (HOPG), hard carbon, soft carbon, or the like. In addition, an oxide active material may be used as the negative electrode active material. The oxide active material may be a chemical compound (for example, $Li_4Ti_5O_{12}$) that contains Li, Ti and O, or the like.

The negative electrode active material layer in the embodiment of the invention may contain a solid electrolyte material. By adding the solid electrolyte material, the lithium ion conductivity of the negative electrode active material layer is improved. Note that the solid electrolyte material may be the same material as the solid electrolyte material used in the solid electrolyte layer described later. In addition, the negative electrode active material layer may contain a conducting material. By adding the conducting material, the conductivity of the negative electrode active material layer is improved. The conducting material may be, for example, acetylene black, Ketjen black, carbon fiber, or the like. In addition, the negative electrode active material layer may contain a binding agent. The type of binding agent may be, for example, a fluorine-containing binding agent, such as polytetrafluoroethylene (PTFE). The thickness of the negative electrode active material layer is desirably within a range from 0.1 µm to 1000 µm, for example.

3. Solid Electrolyte Layer

The solid electrolyte layer in the embodiment of the invention is formed between the positive electrode active material layer and the negative electrode active material layer. The solid electrolyte material for the solid electrolyte layer is not particularly limited as long as it has a lithium ion conductivity. Examples of the solid electrolyte material include, for example, an amorphous oxide solid electrolyte material, such as $Li_2O$—$B_2O_3$—$P_2O_5$, $Li_2O$—$SiO_2$, $Li_2O$—$B_2O_3$ and $Li_2O$—$B_2O_3$—$ZnO$, an amorphous sulfide solid electrolyte material, such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $Li_3PO_4$—$Li_2S$—$SiS$, $LiI$—$Li_2S$—$P_2O_5$, $LiI$—$Li_3PO_4$—$P_2S_5$, and $Li_2S$—$P_2S_5$, a crystalline oxide or oxynitride, such as $LiI$—$Al_2O_3$, $Li_3N$, $Li_3N$—$LiI$—$LiOH$, $Li_{1+x}Al_xTi_{2-x}(PO_4)_3$ ($0 \le x \le 2$), $Li_{1+x+y}A_xTi_{2-x}Si_yP_{3-y}O_{12}$ (A=Al or Ga, $0 \le x \le 0.4$, $0 < y \le 0.6$), $[(A_{1/2}Li_{1/2})_{1-x}B_x]TiO_3$ (A=La, Pr, Nd, Sm, B=Sr or Ba, $0 \le x \le 0.5$), $Li_5La_3Ta_2O_{12}$, $Li_7La_3Zr_2O_{12}$, $Li_6BaLa_2Ta_2O_{12}$, $Li_3PO_{(4-3/2x)}N_x$ (x<1) and $Li_{3.6}Si_{0.6}P_{0.4}O_4$. The thickness of the solid electrolyte layer is desirably within a range from 0.1 to 1000 µm. Among others, the thickness of the solid electrolyte layer is desirably within a range from 0.1 µm to 300 µm.

4. Other Components

The all-solid lithium battery according to the embodiment of the invention at least includes the above described positive electrode active material layer, negative electrode active material layer, and solid electrolyte layer. Furthermore, the all-solid lithium battery usually includes a positive electrode current collector that collects current from the positive electrode active material layer and a negative electrode current collector that collects current from the negative electrode active material layer. Examples of the material for the positive electrode current collector include stainless steel, aluminum, nickel, iron, titanium, and carbon. Among others, the material for the positive electrode current collector is desirably stainless steel. Examples of the material for the negative electrode current collector include stainless steel, copper, nickel, and carbon. Among others, the material for the negative electrode current collector is desirably stainless steel. In addition, the thickness, shape, and the like, of each of the positive electrode current collector and the negative electrode current collector are desirably selected appropriately based on an application of the battery, for example. In addition, the battery case used in the embodiment of the invention may be a battery case for a commonly used battery. The battery case may be, for example, a stainless steel battery case.

5. All-Solid Lithium Battery

The all-solid lithium battery according to the embodiment of the invention is typically a secondary battery and is useful as, for example, an in-vehicle battery. Examples of the shape of the all-solid lithium battery according to the embodiment of the invention include a coin shape, a laminated shape, a cylindrical shape, a square shape, or the like. In addition, a method of manufacturing the all-solid lithium battery according to the embodiment of the invention is not particularly limited as long as the above described all-solid lithium battery is obtained. The method of manufacturing the all-solid lithium battery may be a method similar to a typical method of manufacturing a battery. An example of the method of manufacturing the all-solid lithium battery according to the embodiment of the invention is as follows: a material for the solid electrolyte layer and a material for the negative electrode active material layer are sequentially arranged on the positive electrode active material layer (electrode thin film) and pressed to manufacture a power generating element; the power generating element is accommodated inside a battery case; and then the battery case is crimped. In addition, the positive electrode active material layer is, for example, formed by a deposition method (aerosol deposition, or the like) described later. Similarly, at least one of the solid electrolyte layer and the negative electrode active material layer may also be formed by the deposition method (aerosol deposition, or the like) described later.

C. Method of Manufacturing Electrode Thin Film

Next, the method of manufacturing the electrode thin film according to the embodiment of the invention will be described. The method of manufacturing the electrode thin film according to the embodiment of the invention is a method of manufacturing the electrode thin film to be used in the all-solid lithium battery, and is characterized by including a disposition step of forming an electrode thin film that is formed predominantly of lithium cobaltate and that has a density larger than or equal to 3.6 g/cm$^3$ and smaller than or equal to 4.9 g/cm$^3$.

According to the embodiment of the invention, it is possible to obtain the electrode thin film having a high lithium ion conductivity by forming the electrode thin film so as to be able to obtain a specific density. Furthermore, according to the embodiment of the invention, it is possible to obtain the electrode thin film having a high mechanical strength by forming the electrode thin film so as to be able to obtain a specific density. In an existing art, wet coating using slurry is generally employed as a method of manufacturing an electrode for an all-solid lithium battery. However, wet coating has a drawback that it is difficult to obtain a dense electrode. Note that, for the purpose of improving the denseness, pressing an electrode has also been performed in the existing art; however, improvement of the denseness is limited. In contrast to this, in the embodiment of the invention, it is possible to easily obtain the electrode thin film having a high denseness using a deposition method.

The deposition method in the embodiment of the invention is not particularly limited as long as a thin film having a specific density is obtained. Examples of the deposition method include aerosol deposition, gas deposition, flame spraying, and cold spraying. Among others, aerosol deposition and gas deposition are desirable. Here, the aerosol deposition is a method in which fine particles that serve as raw material are blown up into a gas phase by, for example, supply of gas, vibrations, ultrasonic vibrations, or the like, dispersed (mixed) into carrier gas to be aerosolized and the aerosolized fine particles are caused to collide with a substrate to obtain a film that originates from fine particles. On the other hand, the gas deposition is a method in which, after raw material is vaporized, the vaporized raw material is re-precipitated in a gas phase as nanoparticles, the nanoparticles are dispersed (mixed) into carrier gas, the dispersed nanoparticles are caused to collide with a substrate to obtain a film that originates from nanoparticles. In the aerosol deposition and the gas deposition, the speed of collision of aerosolized fine particles or nanoparticles to a substrate is low as compared with flame spraying and cold spraying, and the aerosol deposition and the gas deposition are advantageous in that the density is easily controlled. Furthermore, the aerosol deposition has an advantage that a film may be formed in a room temperature environment. Since a film may be formed in a room temperature environment, the aerosol disposition has an advantage that a dense film is easily formed. Thus, in the embodiment of the invention, a film is desirably formed by aerosol deposition.

Figure 2:
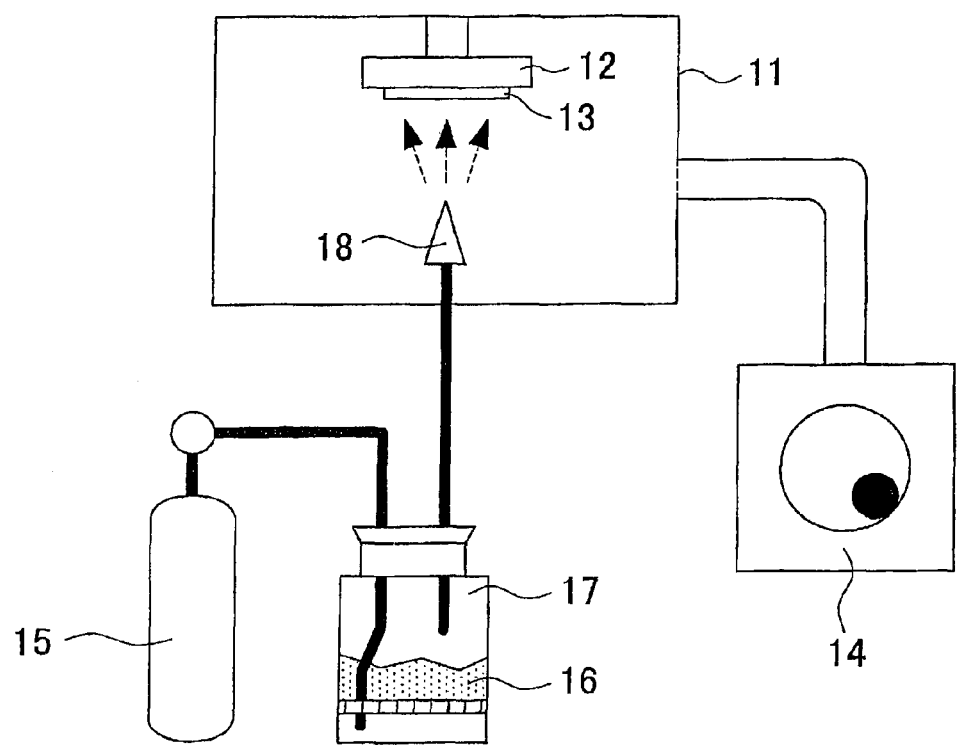
FIG. 2 is a schematic diagram that illustrates aerosol deposition.

FIG. 2 is a schematic diagram that illustrates aerosol deposition (AD) method. In FIG. 2, a seat 12 is provided inside a chamber 11, and a substrate 13 is arranged on the seat 12. For example, a thin-film current collector may be used as the substrate 13. In addition, the pressure inside the chamber 11 can be controlled by a rotary pump 14 into a selected decompressed state. On the other hand, a raw material 16 is aerosolized by carrier gas supplied from a gas cylinder 15 inside an aerosol generator 17. Furthermore, the aerosolized raw material is injected toward the substrate 13 from a nozzle 18 arranged inside the chamber 11. On the surface of the substrate 13, particles are subjected to destructive deformation and deposited to form a thin film.

In the AD method, raw material powder that at least contains lithium cobaltate is used. The mean particle diameter (d50) of the raw material powder is not particularly limited. For example, the mean particle diameter of the raw material powder is desirably within a range from 0.1 μm to 5.0 μm, and is more desirably within a range from 0.5 μm to 2.0 μm. Note that the mean particle diameter of the raw material powder may be obtained from, for example, a particle size distribution-measuring device. In addition, in order to adjust the mean particle diameter of the raw material powder, pulverizing using mechanical milling (for example, ball milling), predetermined sizing, etc. are desirably performed.

A pressure P when the film is formed using the AD method is not particularly limited as long as a desired density is obtained. For example, the pressure P is desirably higher than 100 Pa, more desirably higher than or equal to 120 Pa, and further desirably higher than or equal to 150 Pa. This is because, when the pressure during film formation is too low, the density of the electrode thin film may become too large. On the other hand, the pressure P is desirably lower than or equal to 400 Pa, and more desirably lower than or equal to 350 Pa, for example. This is because, when the pressure during film formation is too high, it may be difficult to obtain a dense electrode thin film. In addition, the pressure P is desirably lower than or equal to a pressure at which a thin film having a lithium ion conductivity higher than that of a lithium cobaltate thin film having a theoretical density (4.9 g/cm$^3$) may be obtained.

The type of carrier gas used in the AD method is not particularly limited, and examples thereof include an inert gas, such as helium (He), argon (Ar), and nitrogen ($N_2$), and dry air. In addition, the flow rate of carrier gas is not particularly limited as long as a desired aerosol is maintained. For example, the flow rate of carrier gas is desirably within a range from 3 L/min to 8 L/min.

Note that the aspect of the invention is not limited to the above embodiment. The above described embodiment is merely an example. The scope of the invention encompasses any embodiment that includes substantially equivalent components and has substantially similar advantageous effects to those of the technical ideas recited in the appended claims.

Hereinafter, the aspect of the invention will be more specifically described with reference to an example.

EXAMPLE

First, commercially available lithium cobaltate ($LiCoO_2$, produced by Toda Kogyo Corporation) was prepared. Subsequently, 150 g of lithium cobaltate was put into a zirconia pot (45 ml) together with zirconia balls (10 mmφ, 10 balls) and then the pot was completely hermetically sealed. The pot was mounted on a planetary ball milling machine (P7 produced by Fritsch). Then, mechanical milling was performed at a table rotational speed of 250 rpm for four hours to subject the raw material to pulverizing. After that, the powdery lithium cobaltate having a mean particle diameter of 1.0 μm was obtained by predetermined sizing. Subsequently, the thin film made of lithium cobaltate was formed on the Al substrate by aerosol deposition. The film formation conditions Were as listed below. The plurality of thin films were formed while only the pressure in the chamber was being changed. Note that the thicknesses of the plurality of obtained thin films were measured, and all fell within the range of 5 μm to 12 μm.

<Film Formation Conditions>

| Temperature | Room Temperature |
|---|---|
| Gas | He |
| Gas Flow Rate | 4 L/min |
| Pressure in Chamber | 60 Pa to 2700 Pa |

Evaluation

The densities and lithium ion conductivities of the thin films obtained in the example were measured. Note that the method of measuring the density and the lithium ion conductivity is the same as that described above. The measurement results are shown in Table 1 and FIG. 3.

TABLE 1

| PRESSURE IN CHAMBER. (Pa) | DENSITY ($g/cm^3$) | Li ION CONDUCTIVITY (S/cm) |
|---|---|---|
| 60 | 5.30 | $5.9 \times 10^{-4}$ |
| 80 | 5.00 | $6.0 \times 10^{-4}$ |
| 100 | 4.92 | $9.1 \times 10^{-4}$ |
| 150 | 4.54 | $12.4 \times 10^{-4}$ |
| 200 | 4.18 | $14.1 \times 10^{-4}$ |
| 300 | 3.68 | $6.6 \times 10^{-4}$ |
| 400 | 3.62 | $2.4 \times 10^{-4}$ |
| 600 | 3.55 | $1.4 \times 10^{-4}$ |
| 800 | 3.56 | $1.0 \times 10^{-4}$ |
| 2700 | 3.33 | $0.3 \times 10^{-4}$ |

Figure 3:
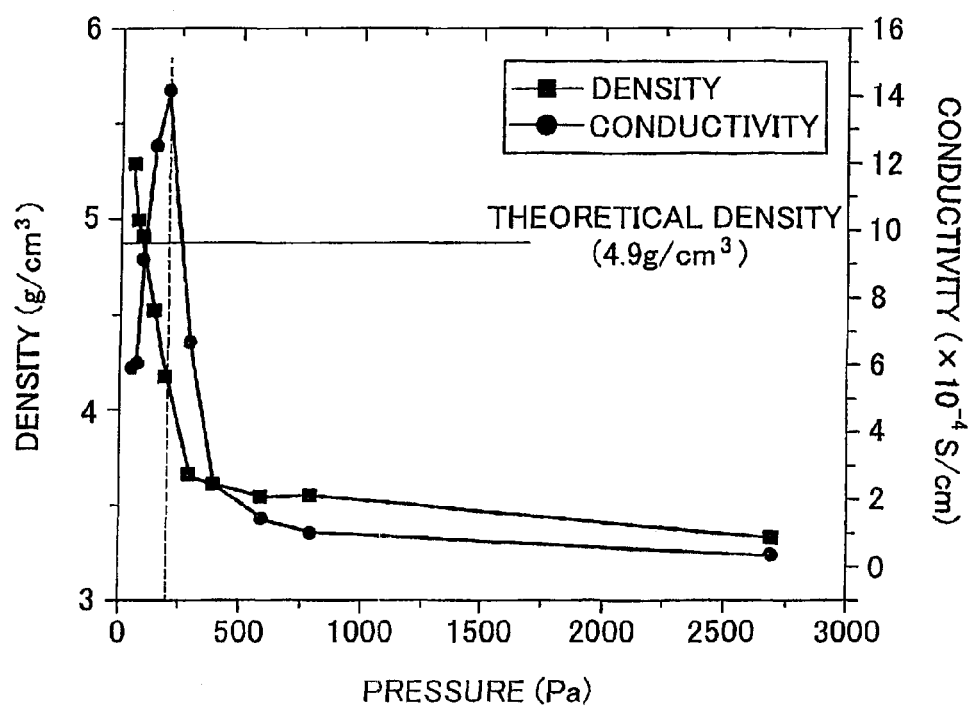
FIG. 3 shows the measured results of the densities and lithium ion conductivities of thin films obtained in an example.

As is apparent from Table 1 and FIG. 3, it has been confirmed that, when the pressure in the chamber is lower than or equal to 400 Pa, the lithium ion conductivity and the denseness remarkably increase. On the other hand, when the pressure in the chamber was set to be low, the thin film having a density larger than the theoretical density (4.9 $g/cm^3$) of lithium cobaltate was formed. When the density of the formed thin film is larger than the theoretical density, the thin film has a strain. The strain of the thin film is considered as a factor of a decrease in crystallinity, and it is considered that a decrease in crystallinity may interfere the movement of lithium ions (insertion and desorption of lithium ions and conduction of lithium ions).

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. An electrode thin film to be used in an all-solid lithium battery, wherein:
   the electrode thin film is formed predominantly of lithium cobaltate,
   the electrode thin film has a density larger than or equal to 3.6 $g/cm^3$ and smaller than or equal to 4.9 $g/cm^3$,
   a percentage of the lithium cobaltate in the entire electrode thin film is higher than or equal to 90 mol %, and
   the electrode thin film has a thickness ranging from 5-12 μm, wherein
      a pressure when the electrode thin film is formed is higher than 100 Pa and smaller than or equal to 400 Pa.

2. The electrode thin film according to claim 1, wherein the electrode thin film is formed using one selected from the group consisting of aerosol deposition, gas deposition, flame spraying, and cold spraying.

3. An all-solid lithium battery comprising:
   a positive electrode active material layer that contains a positive electrode active material;
   a negative electrode active material layer that contains a negative electrode active material; and
   a solid electrolyte layer that is formed between the positive electrode active material layer and the negative electrode active material layer, wherein
   the positive electrode active material layer is the electrode thin film according to claim 1.

4. The all-solid lithium battery according to claim 3, wherein the all-solid lithium battery is a secondary battery.

5. A method of manufacturing an electrode thin film to be used in an all-solid lithium battery, comprising:
   forming an electrode thin film that is formed predominantly of lithium cobaltate and that has a density larger than or equal to 3.6 $g/cm^3$ and smaller than or equal to 4.9 $g/cm^3$,
   wherein a pressure used when the electrode thin film is formed is higher than 100 Pa and smaller than or equal to 400 Pa
      a percentage of the lithium cobaltate in the entire electrode thin film is higher than or equal to 90 mol %, and
      the electrode thin film has a thickness ranging from 5-12 μm.

6. The method according to claim 5, wherein, when the electrode thin film is formed, the electrode thin film is formed using one selected from the group consisting of aerosol deposition, gas deposition, flame spraying, and cold spraying.

* * * * *